Feb. 19, 1935.  R. H. GREEGOR  1,992,006
AUTOMATIC SPRING APPARATUS TO RAISE OVERHEAD DOORS
Filed May 29, 1933  7 Sheets-Sheet 1
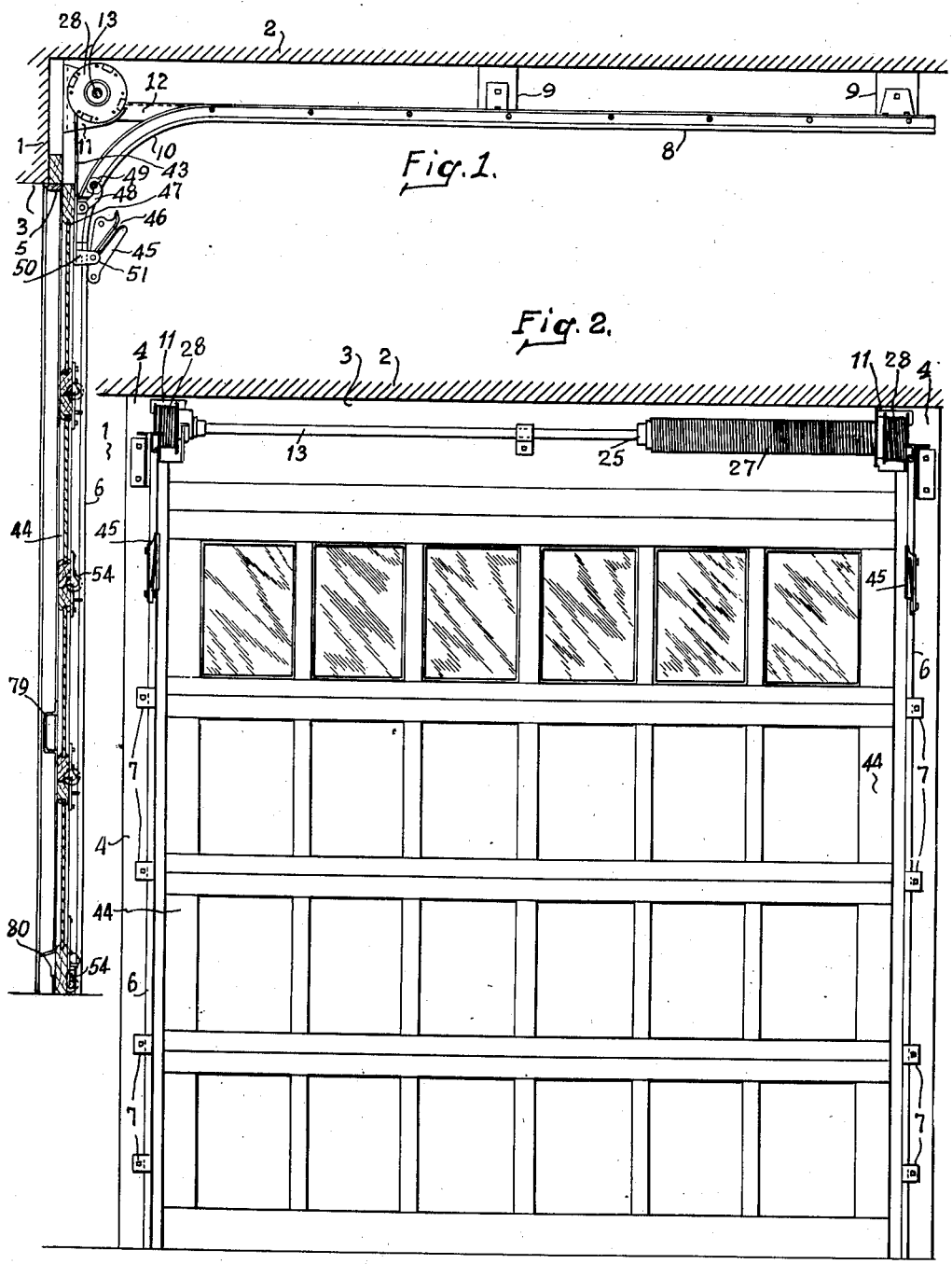
RALPH H. GREEGOR, Inventor
BY Toulmin & Toulmin
Attorneys Feb. 19, 1935. R. H. GREEGOR 1,992,006
AUTOMATIC SPRING APPARATUS TO RAISE OVERHEAD DOORS
Filed May 29, 1933 7 Sheets-Sheet 2
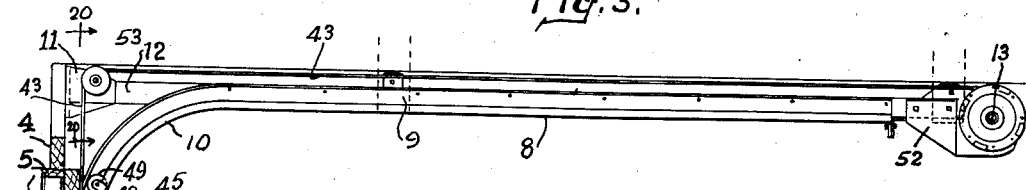
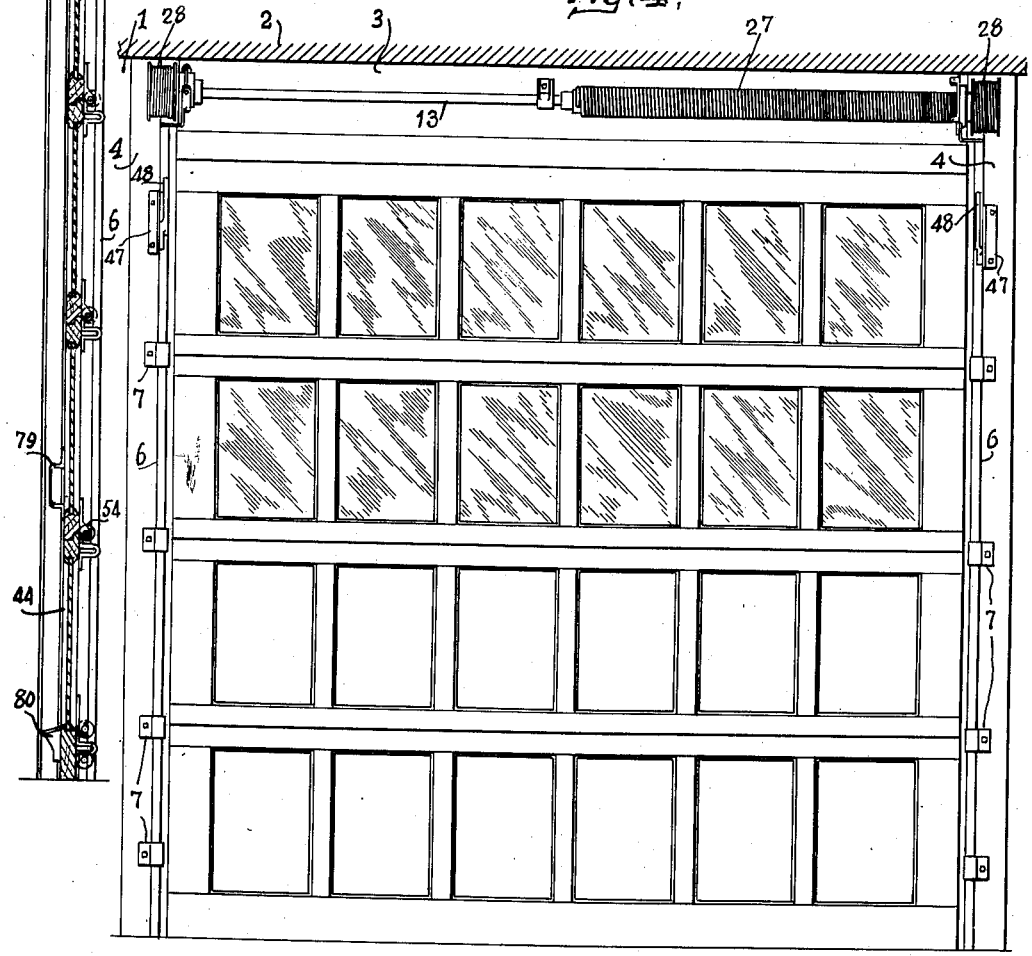
Inventor
RALPH H. GREEGOR,
BY
Toulmin & Toulmin
Attorneys Feb. 19, 1935.   R. H. GREEGOR   1,992,006
AUTOMATIC SPRING APPARATUS TO RAISE OVERHEAD DOORS
Filed May 29, 1933   7 Sheets-Sheet 3
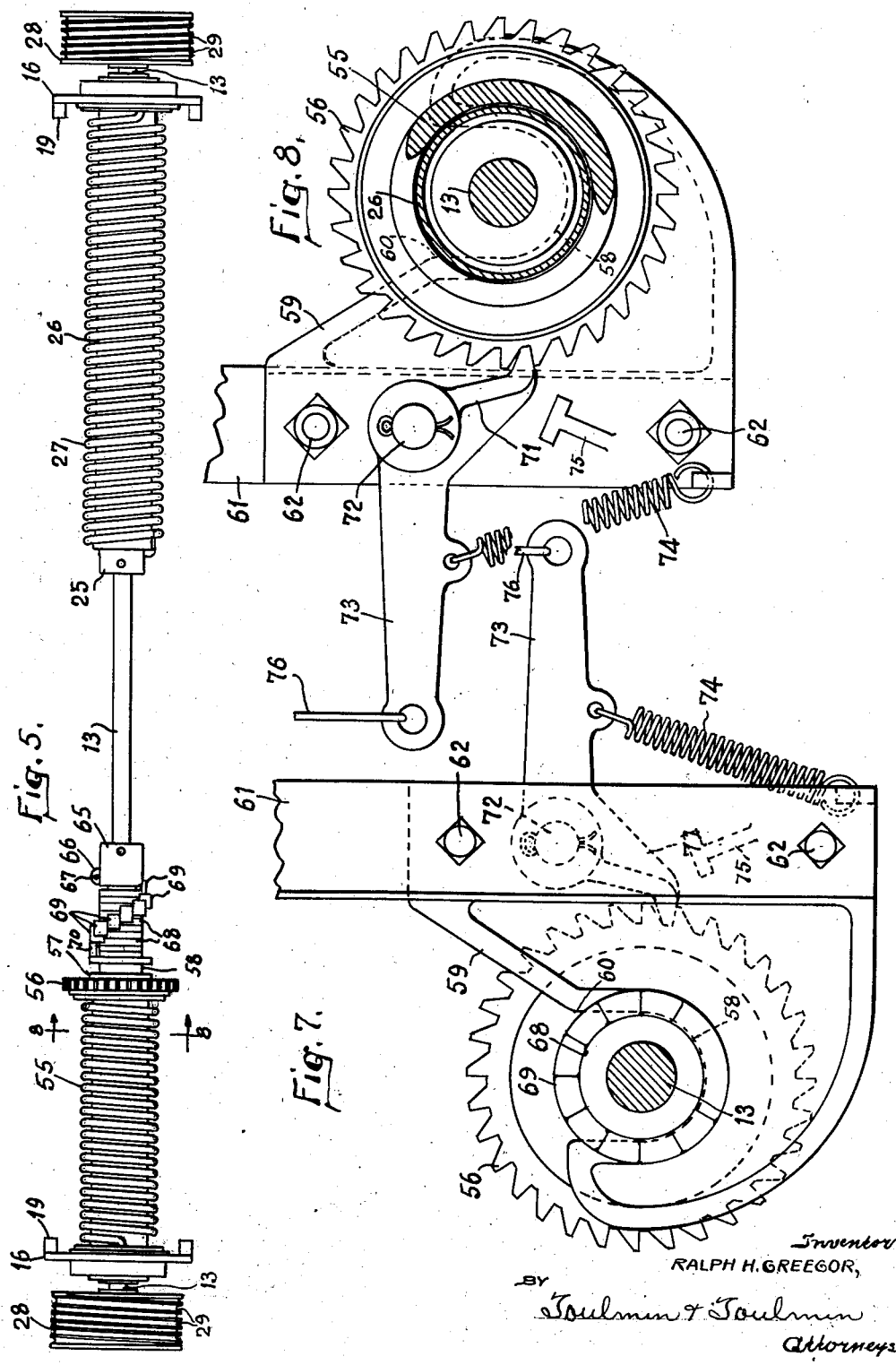
Inventor
RALPH H. GREEGOR,
BY
Toulmin & Toulmin
Attorneys

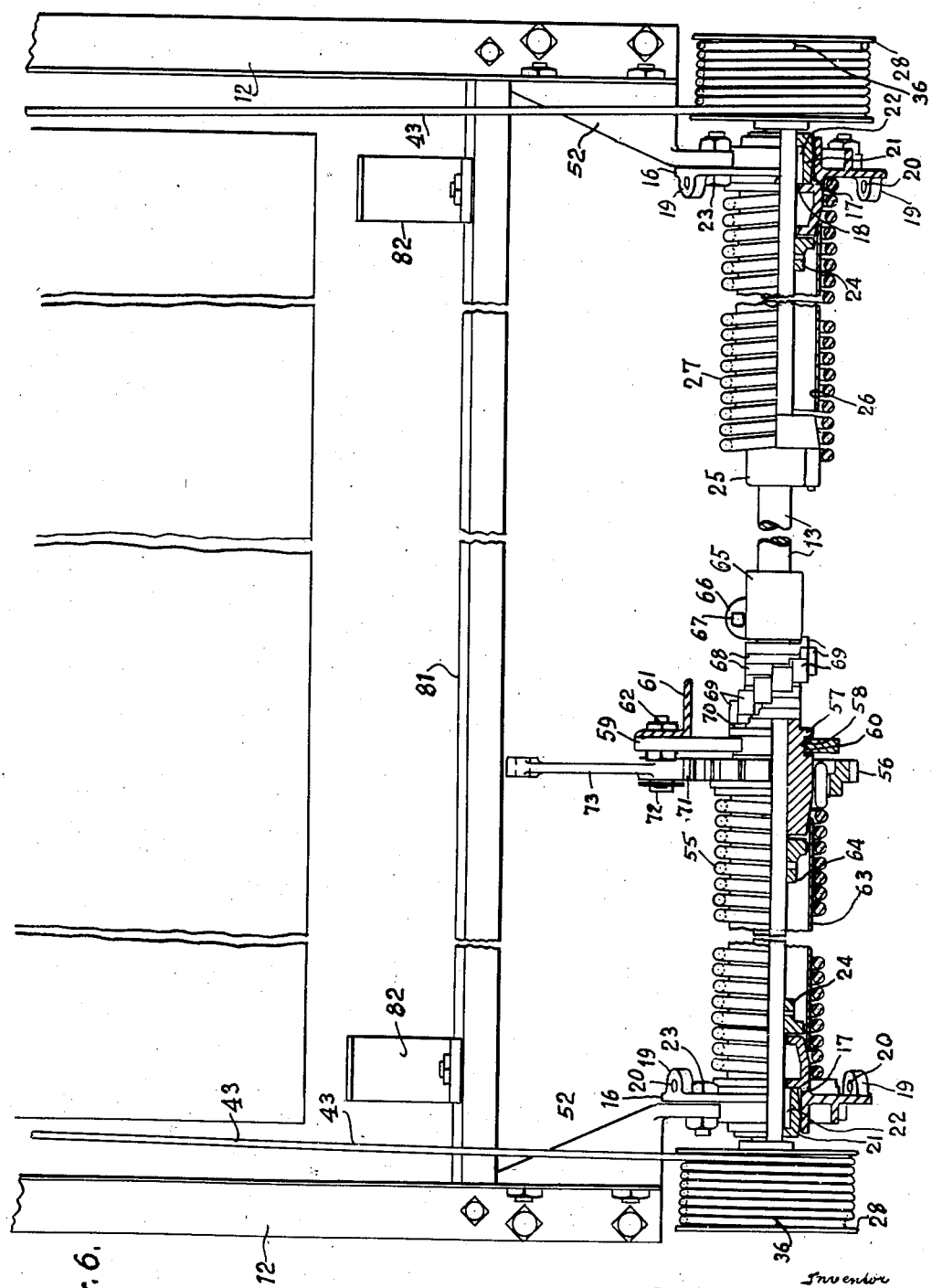

Feb. 19, 1935.  R. H. GREEGOR  1,992,006
AUTOMATIC SPRING APPARATUS TO RAISE OVERHEAD DOORS
Filed May 29, 1933   7 Sheets-Sheet 5
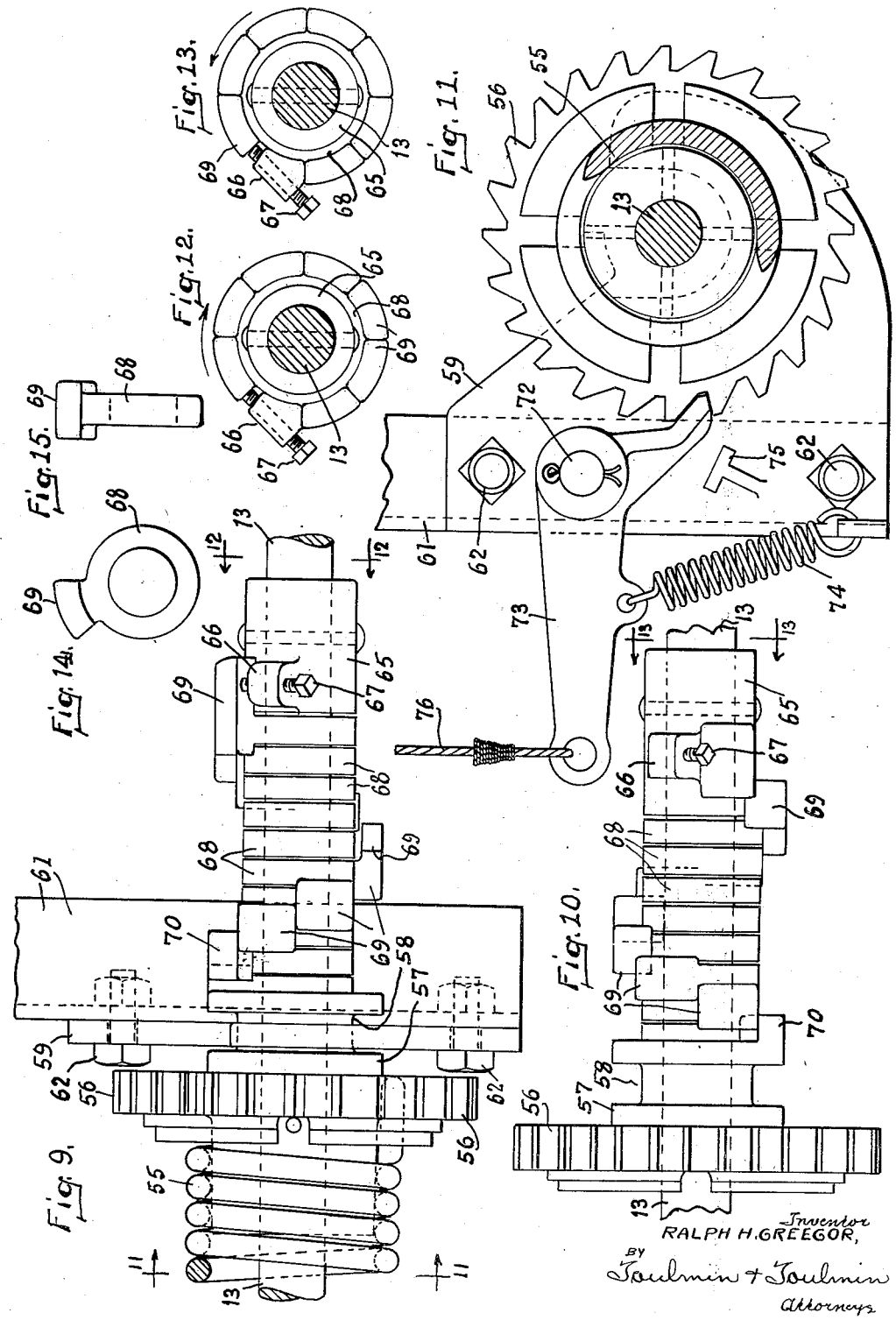
Inventor
RALPH H. GREEGOR,
BY Toulmin & Toulmin
Attorneys Feb. 19, 1935.    R. H. GREEGOR    1,992,006
AUTOMATIC SPRING APPARATUS TO RAISE OVERHEAD DOORS
Filed May 29, 1933    7 Sheets-Sheet 6

Inventor
RALPH H. GREEGOR,
BY
Toulmin & Toulmin
Attorneys

Feb. 19, 1935.    R. H. GREEGOR    1,992,006
AUTOMATIC SPRING APPARATUS TO RAISE OVERHEAD DOORS
Filed May 29, 1933    7 Sheets-Sheet 7
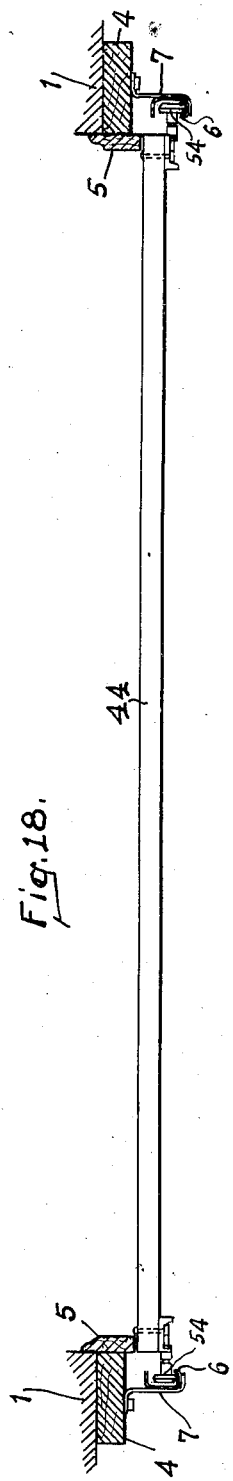
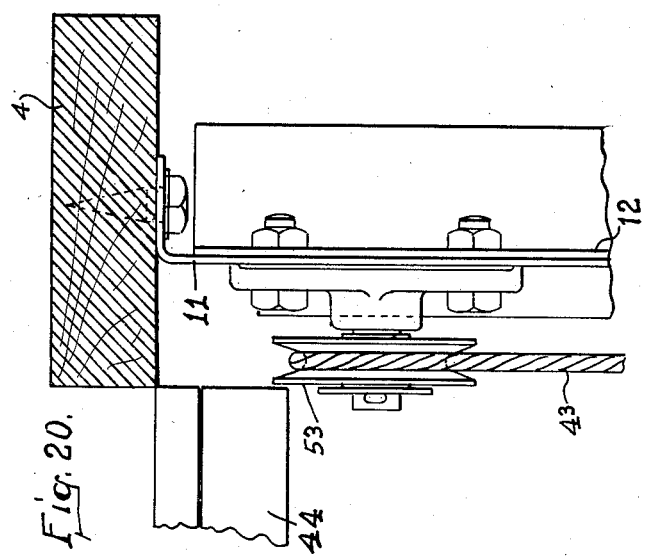
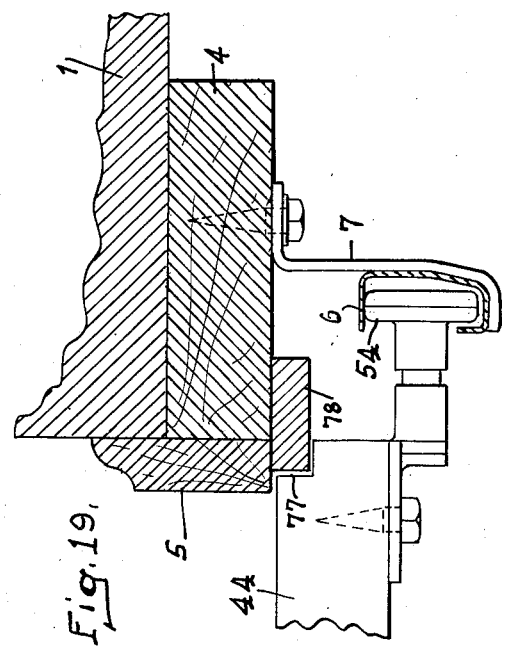
Inventor
RALPH H. GREEGOR,
BY
Toulmin & Toulmin
Attorneys Patented Feb. 19, 1935

1,992,006

UNITED STATES PATENT OFFICE 1,992,006

AUTOMATIC SPRING APPARATUS TO RAISE OVERHEAD DOORS

Ralph H. Greegor, Columbus, Ohio, assignor to The Kinnear Mfg. Company, Columbus, Ohio, a corporation of Ohio Application May 29, 1933, Serial No. 673,464

10 Claims. (Cl. 189—57)

This invention relates to improvements in overhead articulate doors, and has for its object to provide, in connection with such doors, a counterbalance means to aid in the opening and closing of the doors for ordinary use.

It is an object of this invention to provide, in connection with an overhead door and a counterbalance means connected therewith, means for a rapid opening of the door in cases of emergency, such means comprising an automatic driving spring adapted to be operatively connected to the door or detached therefrom.

It is particularly the object of this invention to provide, in connection with an overhead door, counterbalance means for operating the door under normal conditions, and means cooperating with the counterbalance means for opening the door in the case of an emergency when rapid action is desired.

It is the object of this invention to provide means for yieldingly counterbalancing the door to facilitate its raising and lowering by hand; and to combine with this normally operative counterbalancing means, yielding means abnormally operative for rapidly elevating the door in conjunction with the counterbalancing means to lift the door without manual assistance.

It is an object to so provide this arrangement that there is a clutch between the emergency lifting apparatus and the remainder of the mechanism that permits of the free operation of the door and the counterbalancing means without disturbing the emergency lifting means; and when the door is shut this clutch is in position to immediately transmit the movement of the emergency lifting means to the door when that means is released for that purpose.

Referring to the drawings:

Figure 1 is a vertical section through part of a building having a doorway therein, together with a section of the door and the operating mechanism for moving the door. In this form the door operating mechanism is located on the wall of the building over the doorway.

Figure 2 is a view showing the inside of the door and the adjacent wall and the ceiling, with the door closed. In this figure the door operating mechanism is located above the doorway.

Figure 3 is a view similar to Figure 1 but with the door operating mechanism located on the free ends of the horizontal tracks for supporting the door.

Figure 4 is an inside view of the door and the door operating structure shown in Figure 3.

Figure 5 is a side elevation of the operating shaft and associated mechanism for operating the door.

Figure 6 is a view similar to Figure 5 but with parts broken away to show the interior structure.

Figure 7 is a side elevation of a ratchet mechanism used in connection with the automatic driving spring and a bracket support therefor, with the shaft in section.

Figure 8 is a section on the line 8—8 of Figure 5.

Figure 9 is an enlarged detail view of the ratchet and its support and cooperating structure used in connection with the automatic driving spring. In this figure the discs and the tumblers are in such engagement that if the pawl were released from the ratchet wheel the spring would operate to elevate the door.

Figure 10 shows the ratchet wheel, the discs and tumblers in the positions they assume when the ratchet wheel is engaged by the pawl and the door is raised for ordinary passage, and without the cooperation of the automatic driving spring.

Figure 11 is a section on the line 11—11 of Figure 9.

Figure 12 is a section on the line 12—12 of Figure 9.

Figure 13 is a section on the line 13—13 of Figure 10.

Figure 14 is a side elevation of one of the discs with the tumblers thereon.

Figure 15 is an edge view of one of the discs with the tumblers thereon.

Figure 18 is a section through the door jambs just above the upper edge of the door, and showing the upper edge of the door and the tracks in section.

Figure 19 is a section through one part of the door jamb showing the door with a notch in one corner and a sealing strip on the jamb fitting in the notch.

Figure 20 is a section on the line 20—20 of Figure 1.

Figure 17:
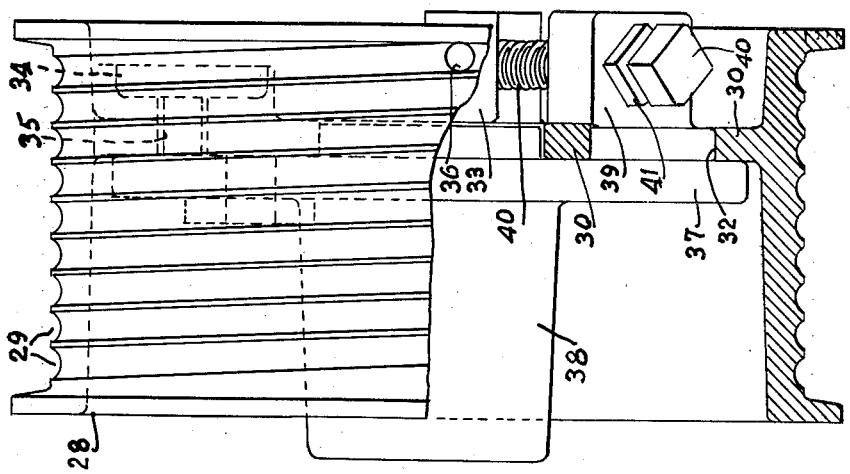
Figure 17 is a side elevation of the drum with parts broken away to show the interior of the structure.
Figure 16:
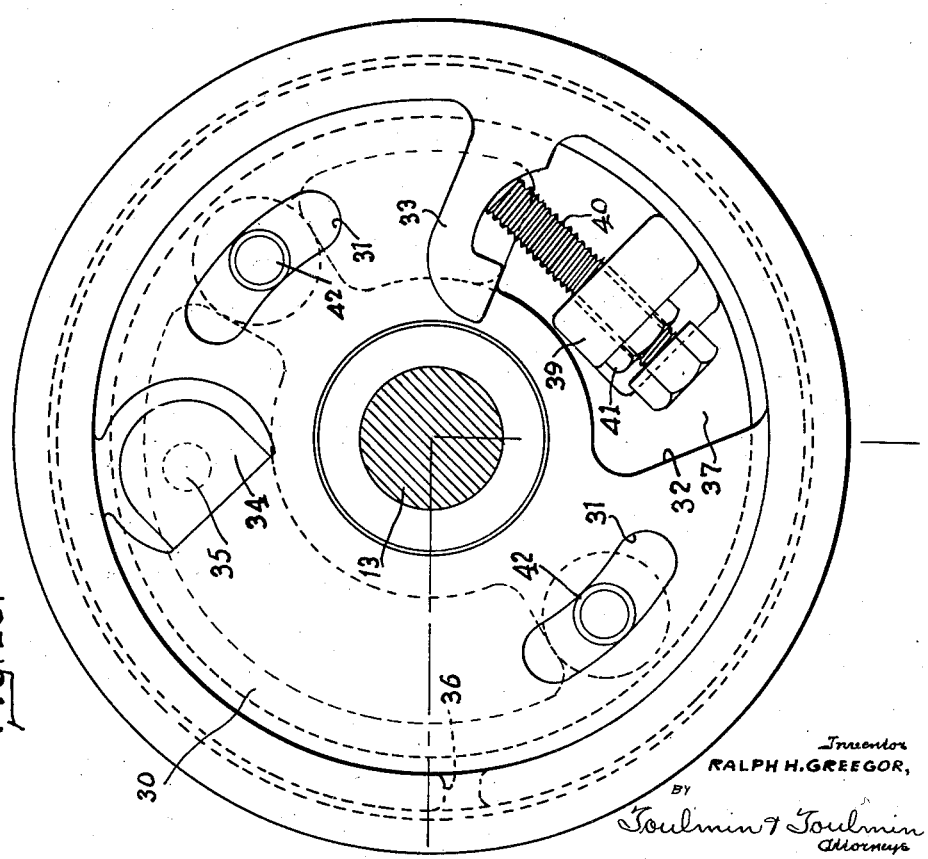
Figure 16 is a view showing one end of the door cable supporting drum.

The door of this application and its operating mechanism are adapted to be used in connection with various buildings, and particularly in connection with buildings used for fire trucks.

The wall of the building is indicated by the numeral 1, and has supported thereon the usual ceiling or overhead structure 2. In the wall is a doorway 3, which has across the top and down each side a jamb strip 4. Inside of these strips and around the doorway are mold strips 5, against which the door will engage when in closed position.

On each side of the doorway is a vertical track 6, supported thereon by means of brackets 7 suitably attached to the wall and to the track. Supported in a horizontal position beneath the ceiling and above the door are two trackways 8, each connected to one of the vertical tracks by means of an arcuate track 10. The horizontal tracks are supported on the ceiling by means of brackets 9. The horizontal tracks, the vertical tracks and the arcuate connection form the complete trackway for supporting the door in various positions from a closed to an open overhead supported position.

On each side of the doorway and on the wall above the doorway is a wall bracket 11 adapted to support a transverse shaft 13. Each of these brackets is connected to the horizontal track by means of an arm 12. These arms help to properly support the brackets and also give strength and rigidity to the tracks. Each wall bracket has a seat 14 therein and holes 15 on diametrically opposite sides of the seat.

These seats are adapted to receive and properly seat a ring casting 16, which is enlarged at one end to form a chamber 17. Each ring casting has a central hole 18 extending from the center of the chamber for the shaft 13. This casting has a plurality of holes arranged around the central shaft hole adapted to receive bolts by which the casting may be fastened to the wall bracket. Two bolts are used for each casting and they extend through two holes in the casting, through the two holes in the wall bracket.

Since there are more than two holes in the ring casting and the ring casting is rotatably adjustable on the bracket, the ring casting may be adjusted to various positions and held therein by means of the bolts passing through the holes. For the purpose of rotating the ring castings each is provided on its periphery with a plurality of ears 19, each having a hole 20 therein to receive a suitable tool.

In the chamber 17 of each ring casting is a bearing cage 21, which fits over the shaft 13 and has between the shaft and the inner surfaces of the bearing cage roller bearing members 22. The bolts used for supporting the ring casting in adjusted position with relation to the wall bracket are indicated by the numeral 23. There are two of these ring castings, one adjacent each end of the shaft, and adjacent each ring casting there is a sleeve 24 suitably attached to the shaft to prevent the longitudinal movement of the shaft with relation to the ring castings and the wall brackets.

There is also provided on the shaft a collar 25 spaced from one of the sleeves 24. Around the shaft and between this collar and its adjacent ring casting is a cylindrical casing 26, suitably supported at one end on the ring casting. A spring 27 is coiled around the casing 26, and has one end attached to the ring casting while its other end is attached to the collar 25. This is the counterbalance spring and is used for ordinary hoisting and lowering purposes.

On each end of the spring without the wall bracket is a drum 28, which has on its periphery a groove 29. Each drum is provided on its interior with a web 30 having oppositely disposed arcuate slots 31 and a large aperture 32. There is also provided in the web an abutment 33 and an arcuate cable seat 34, in the center of which is a bolt hole 35 adapted to pass through a loop in the cable for holding the cable seated in the seat 34. There is also provided in the periphery of the drum and at one end of the groove a cable hole 36. The groove is spiral shaped and extends from the hole 36, around the drum, from one end to the other.

Fitting within the drum is a casting 37, which has a hub 38 thereon with a hole to receive the shaft 13, and by which the casting is attached to the shaft to rotate therewith. The casting has a lug 39 adapted to pass through the aperture 32. Extending through the lug is a screw 40 which engages the abutment 33 for holding the casting in proper position with relation to the outer part of the drum. This screw has a locknut 41 thereon to prevent its rotation after it has been properly adjusted.

The casting is provided with holes 42 adapted to align with the slots 31 in the web of the drum. For the purpose of holding these two parts together, the casting and the drum, bolts are passed through the slots and through the holes in the web, or screws may be passed through the slots and threaded into the holes in the web so that a slight adjustment may be made between the casting and the web part of the drum. The cable attached at one end to the seat 34 and passing through the hole 36 is indicated by the numeral 43. There is one of these cables for each drum, and it passes about the drum and has its lower end attached to the lower end of the door, which is composed of a plurality of sections 44.

On the wall at each side of the doorway adjacent the upper edge of the door when it is closed there is a bracket 45, which has a downwardly and outwardly inclined slot 46. On each edge of the door, at the top thereof, is a plate 47 which has at its upper end an arm 48 pivoted at one end to the plate, with a roller 49 on its other end fitting in one of the tracks 8. On the lower end of each plate is an inwardly projecting arm 50, which has on its free end a roller 51 adapted to engage the bracket 45 in the slot 46 for forcing the upper part of the door against the door jambs.

In the form shown in Figures 3 and 4 the shaft 13, instead of being supported immediately above the door, is supported on the ends of the tracks by means of brackets 52 suitably attached to the ends of the tracks. In this form there is attached to the bracket 11 a roller 53, over which the cable passes from the lower edge of the door to the drums located on the shaft 13, supported on the ends of the tracks. On each edge of the door is a plurality of rollers 54 engaging the tracks for guiding the door during its closing and opening operations.

In Figure 5 there is shown the automatic spring 55. This spring is adapted to cooperate with the spring 27 for rapid opening of the door, and is an automatic driving spring. One end of this spring is attached to one of the ring castings in the same manner as spring 27. The other end of this spring 55, instead of being attached to a collar 25, is attached to a ratchet wheel 56 rotatably mounted on a sleeve 57, suitably attached to the shaft 13 for rotation therewith.

In this sleeve 57 is a groove 58 adapted to receive the seat part 60 of a bracket 59 suitably attached to a support 61 by means of bolts 62. This support is supported in some suitable manner on the wall or the ceiling of the building. Between the sleeve 57 and one of the ring castings is a cylindrical sleeve 63, around which the spring 55 is coiled. The sleeve 57 is held against movement on the shaft toward the ring casting by means of a collar 64.

There is also located on the shaft 13 a collar 65, which has extending therefrom an ear 66 with a screw 67 therein. Between this collar and the end of the sleeve 57, remote from the spring 55, is a plurality of discs 68, on each of which are disposed tumblers 69. One of the tumblers on the disc adjacent the collar 65 is adapted to be engaged by the screw 67, while one of the tumblers on the disc adjacent the sleeve 57 is adapted to engage a lug 70 on the sleeve.

To hold the ratchet wheel 56 there is provided a pawl 71, pivoted at 72 on the support 61. Extending from this pawl at its pivot point is an arm 73, by which the pawl may be released from the ratchet. A spring 74 attached at one end to the arm 73 and at its other end to the support 61 tends to hold the pawl in engagement with the teeth of the ratchet wheel.

For the purpose of limiting the movement of the pawl away from the ratchet wheel there is provided a stop 75. The pawl is released from the ratchet wheel by means of a cable or rope 76 attached at one end to the free end of the arm 73.

As shown in Figure 19, the door has on each edge a notch 77 adapted to receive a sealing strip 78 attached to the door jamb strip and mold strip. There is also provided, in connection with the door, a hand hold 79 and a foot piece 80.

In the form shown in Figures 1 to 4 no automatic driving spring is used. In this form the articulate overhead door may be raised by taking hold of the hand hold and raising the door thereby. The spring 27 is sufficiently tensioned that the door may be readily raised by applying a slight lifting force to the handle. The spring when the door is in closed position has stored up energy therein because of the force applied thereto in closing the door. This stored-up energy is utilized in opening the door when necessary.

The tension of this spring is not sufficient to overcome the weight of the door and to provide a latch means for opening the door, and in order to provide an automatic driving spring an additional spring 55 may be provided on the other end of the shaft 13 from the spring 27, as shown in Figure 5. In the event both springs are used and it is desired to operate the door without employing the automatic driving spring the pawl 71 is maintained in engagement with the ratchet wheel so this wheel cannot turn. The discs permit the rotation of the shaft 13 in regard to the ratchet wheel in one direction.

As shown in Figure 5, the cables are wound upon the drums so that the doors are supported from the rear of the drums so that when the door is elevated the tops of the drums move toward the observer. This rotation of the drums and the shaft 13 will cause the tumblers 69 to move from each other, as shown in Figures 5 and 9, and assume a position shown in Figure 10. These tumblers are sufficient in number to permit of the free rotation of the shaft for suitable elevation of the door. The number should be sufficient that the tumblers will engage each other in a manner the opposite of that in which they engage before the door can be raised, or when the door was in its closed position, such as shown in Figure 5.

In the event it is desired to open the door rapidly and automatically, the cable 76 is pulled to release the pawl 71 from the ratchet wheel. When this is done both springs 27 and 55 act to rotate the shaft 13 and the drums 28, whereby the door is elevated without any manual assistance.

In this operation the top of the ratchet wheel, as shown in Figure 5, is caused to move toward the observer. This movement of the ratchet wheel causes each of the tumblers to engage its neighboring tumbler to rotate the shaft. It will be observed that these tumblers, when the door is in closed position, must engage one another so that as soon as the pawl is released from the ratchet wheel the spring 55 acts upon the shaft to rotate the drums. The spring 27 is so connected that it always acts upon the shaft 13 for rotating the drums.

The tension on the springs may be regulated by adjusting the ring castings with relation to the wall brackets. With the proper adjustment the lowering of the door creates a tension in both springs and stores up energy therein to be used in the future opening of the door. A cross bar 81 connects the outer ends of the tracks 8 and has thereon springs 82 to engage the upper end of the door when open.

Now assume that the door is closed and the ratchet wheel is held by means of the releasing lever and the door is raised by hand. The shaft is turned as the drums revolve and the collar starts to revolve away from the lug on the adjacent tumbler. This collar makes one revolution, then picks up the tumbler on the opposite side; it also revolves one revolution freely and then picks up the adjacent tumbler from the opposite side and the operation is continued until the tumblers are all in contact in the opposite direction, or nearly so, as is shown in the view for the reverse position or when the door is open. If the door is then pulled down by hand, the tumblers reverse their position and again come in contact for the position when the door is closed, as above described. By this means the door can be raised and closed under normal conditions, which would be designated as service operation.

When the door is used on an opening for a fire or police station, a quick emergency opening is sometimes desired and the control point in some cases should be at a position accessible to a man in a driver's seat of a fire truck or police car, or possibly the control point would be on the wall back of the truck or police car. Therefore, by the arrangement above described, whenever the door is closed, the tumblers are always in position to form a direct contact between the free end of the spring and the shaft, but the shaft is free to move away if it is desired to raise the door. This action is similar to what is commonly called free-wheeling in an automobile, where the springs serve the same purpose as the power from the engine and the shaft would be attached to the wheels. It is not necessary that the tumblers come in contact in the reversed or opposite direction when the door is opened as they have no function in this position. The function of the tumblers is only to provide a means whereby the shaft can turn in a direction and with a sufficient number of revolutions to operate the door for service operation, and yet provide an immediate means whereby the free end of the spring can turn the shaft when the door is closed and carry the door to a raised position.

It is also to be noticed that if the spring has been released and raises the door then the relative position of the ratchet wheel, tumblers and collar remains unchanged throughout and they are still in the contact position when the door is open. Therefore, if the release lever is allowed to come in contact with the ratchet wheel then the ratchet wheel can be turned in a direction opposite to the arrow and ratchets by the release lever. This condition permits the door to be pulled down after it has been raised by the automatic spring, and thus by pulling the door down the shaft through the collar does the driving and drives the ratchet wheel in the direction opposite to the arrow and restores the tension to the spring, where the release lever holds the ratchet wheel from turning back and again holds the stored energy of the spring for another automatic opening.

It will be understood that it is desired to comprehend within this invention such modifications as come within the scope of the claims and the invention.

Having thus fully described the invention, what is claimed as new and desired to be secured by Letters Patent, is:

1. In combination, a rotatable member, means to rotate said member in one direction, means to lock said first means against operation on said member, and a loose connection between said member and said first-named means, whereby the second-named means forms a positive stop to limit the rotation of said member in the other direction.

2. In combination, a rotatable member, means to rotate said member in one direction, means to lock said first means against operation on said member, and a loose connection between said member and said first-named means, whereby the second-named means forms a positive stop to limit the rotation of said member in the other direction, said connection consisting of a plurality of independently movable members adapted to engage each other and said member and lock means.

3. In combination, a rotatable member, means to rotate said member in one direction, means to lock said first means against operation on said member, and a loose connection between said member and said first-named means, whereby the second-named means forms a positive stop to limit the rotation of said member in the other direction, said connection comprising a plurality of independently movable discs, each disc having tumblers thereon.

4. In combination, a rotatably mounted shaft, a source of power for rotating the shaft, and a loose connection between said source and the shaft, said connection comprising a plurality of discs on the shaft and interengaging tumblers on the discs.

5. In combination, a rotatably mounted shaft, a support for the shaft, a spring on the shaft for rotating the shaft, said spring having one end fixed, and a loose connection between the other end of the spring and the shaft whereby the shaft may rotate through a definite range in either direction without effecting the spring but if rotated in one direction beyond the range the spring will be coiled for storing up energy.

6. In combination, a shaft, bearings for supporting the shaft so it will rotate, a sleeve movable on the shaft, an adjustable ring casting, a spring having one end connected to the sleeve and its other end fixed to the ring casting, a collar on the shaft, and a loose connection between the sleeve and the collar, whereby the shaft may rotate through a definite range in either direction but if rotated in one direction beyond the range the spring will be coiled for storing up energy.

7. In combination, a shaft, bearings for supporting the shaft so it will rotate, a sleeve movable on the shaft, a spring having one end connected to the sleeve and its other end fixed, a collar on the shaft, a loose connection between the sleeve and the collar, whereby the shaft may rotate through a definite range in either direction but if rotated in one direction beyond the range the spring will be coiled for storing up energy, and means for locking the sleeve when the spring is thus coiled.

8. In combination, a shaft, bearing members for supporting the shaft, a sleeve rotatably mounted on the shaft, a spring having one end attached to a bearing member and its other end attached to the sleeve, a collar on the shaft, and a loose connection between the collar and the sleeve, said loose connection comprising a plurality of discs on the shaft, said discs having tumblers thereon to engage one another and the collar and the sleeve, whereby the shaft may rotate independently of the spring through a definite range or may be rotated by the spring when energy is stored therein.

9. In combination, a shaft, a sleeve rotatably mounted on the shaft, said sleeve having a lug thereon, a projection on the shaft, a plurality of discs on the shaft between the sleeve and the projection, each disc having thereon tumblers adapted to engage one another and the lug and the projection, whereby the shaft may be rotated by rotating the sleeve, and adjustably supported means for rotating the sleeve.

10. In combination, a shaft, a sleeve rotatably mounted on the shaft, said sleeve having a lug thereon, a projection on the shaft, a plurality of discs on the shaft between the sleeve and the projection, each disc having thereon tumblers adapted to engage one another and the lug and the projection, whereby the shaft may be rotated by rotating the sleeve, and means supported about the shaft for rotating the sleeve.

RALPH H. GREEGOR.